US006656433B2

(12) United States Patent
Sasso

(10) Patent No.: US 6,656,433 B2
(45) Date of Patent: Dec. 2, 2003

(54) VIAL ACCESS DEVICE FOR USE WITH VARIOUS SIZE DRUG VIALS

(75) Inventor: John T. Sasso, Gwynedd Valley, PA (US)

(73) Assignee: Churchill Medical Systems, Inc., Horsham, PA (US)

( * ) Notice: Subject to any disclaimer, the term of this patent is extended or adjusted under 35 U.S.C. 154(b) by 437 days.

(21) Appl. No.: 09/801,504

(22) Filed: Mar. 7, 2001

(65) Prior Publication Data

US 2002/0127150 A1 Sep. 12, 2002

(51) Int. Cl.[7] ............................ B01L 11/00; B01L 3/02; B01L 3/00; B01L 9/00; G01N 1/04; G01N 1/10; B65D 39/00; B65D 41/16; B65D 41/18; B26F 1/04

(52) U.S. Cl. ......................... 422/103; 422/99; 422/100; 422/102; 73/864.74; 73/864.41; 215/247; 215/319; 234/128

(58) Field of Search .......................... 422/99, 100, 102, 422/103, 104; 73/864.74, 864.41; 234/128; 215/247, 319

(56) References Cited

U.S. PATENT DOCUMENTS

| | | | | | |
|---|---|---|---|---|---|
| 4,812,293 | A | * | 3/1989 | McLaurin et al. | 422/69 |
| 4,976,925 | A | * | 12/1990 | Porcher et al. | 422/100 |
| 5,037,549 | A | * | 8/1991 | Ballies | 210/515 |
| 5,246,669 | A | * | 9/1993 | Hayashi | 422/101 |
| 5,393,497 | A | | 2/1995 | Haber et al. | |
| 5,429,614 | A | | 7/1995 | Fowles et al. | |
| 5,578,272 | A | * | 11/1996 | Koch et al. | 422/102 |
| 5,746,975 | A | * | 5/1998 | Chateau | 422/61 |
| 5,817,082 | A | * | 10/1998 | Niedospial et al. | 604/414 |
| 5,839,715 | A | | 11/1998 | Leinsing | |
| 5,975,313 | A | * | 11/1999 | Sarstedt | 210/456 |
| 6,113,583 | A | | 9/2000 | Fowles et al. | |
| 6,142,446 | A | | 11/2000 | Leinsing | |
| 6,258,078 | B1 | * | 7/2001 | Thilly | 604/411 |
| 6,265,225 | B1 | * | 7/2001 | Otto et al. | 436/180 |
| 2002/0019622 | A1 | * | 2/2002 | Daubert et al. | 604/411 |
| 2002/0132360 | A1 | * | 9/2002 | Neilson et al. | 436/147 |
| 2002/0141904 | A1 | * | 10/2002 | Rosen et al. | 422/102 |

* cited by examiner

*Primary Examiner*—Jill Warden
*Assistant Examiner*—Brian R. Gordon
(74) *Attorney, Agent, or Firm*—Caesar, Rivise, Bernstein, Cohen & Pokotilow, Ltd.

(57) ABSTRACT

An adapter for mounting on drug vial of various sizes to provide needleless access to the interior of each vial regardless of its size. The adapter includes sharpened cannula surrounded by peripheral sidewall. The peripheral sidewall includes an upper portion and a lower skirt flaring outward from the upper portion and terminates in a peripheral free edge extending beyond the sharpened end of the cannula to protect users from an accidental needle-stick. The sidewall includes plural equidistantly spaced projections extending radially inward to form a ledge also has slits extending upward from the peripheral edge of the skirt to enable portions of the sidewall including the projections to flex outward. By so doing the cap of the vial is enabled to pass between the projections and then return to a position wherein the ledge has inside diameter just slightly less than the outside diameter of the rim of the cap to releasably secure the adapter to the vial with the cannula piercing through the septum of the cap.

20 Claims, 3 Drawing Sheets

FIG. 1
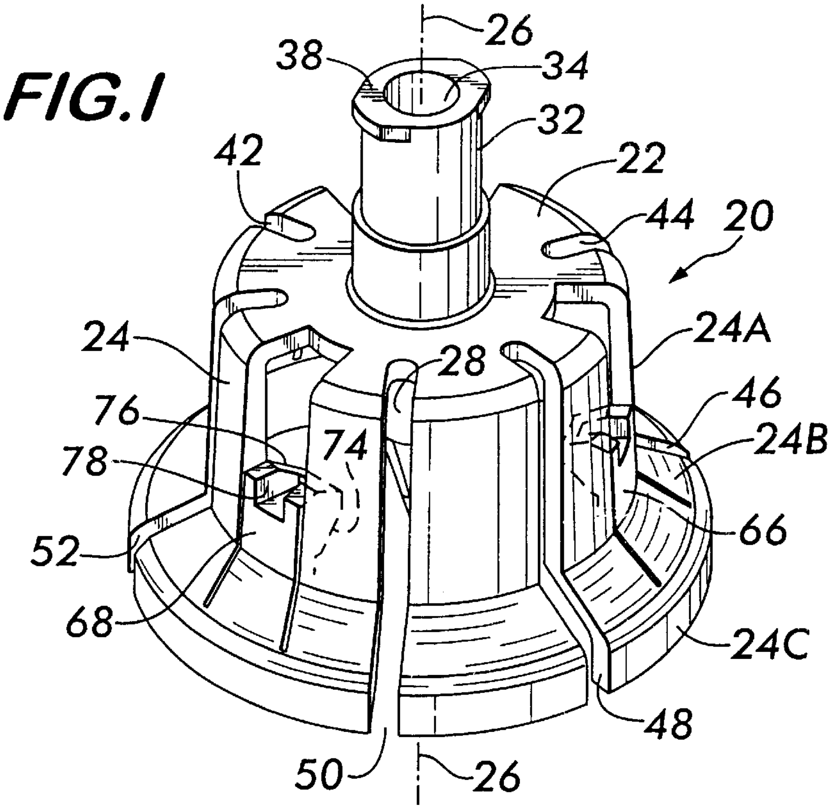
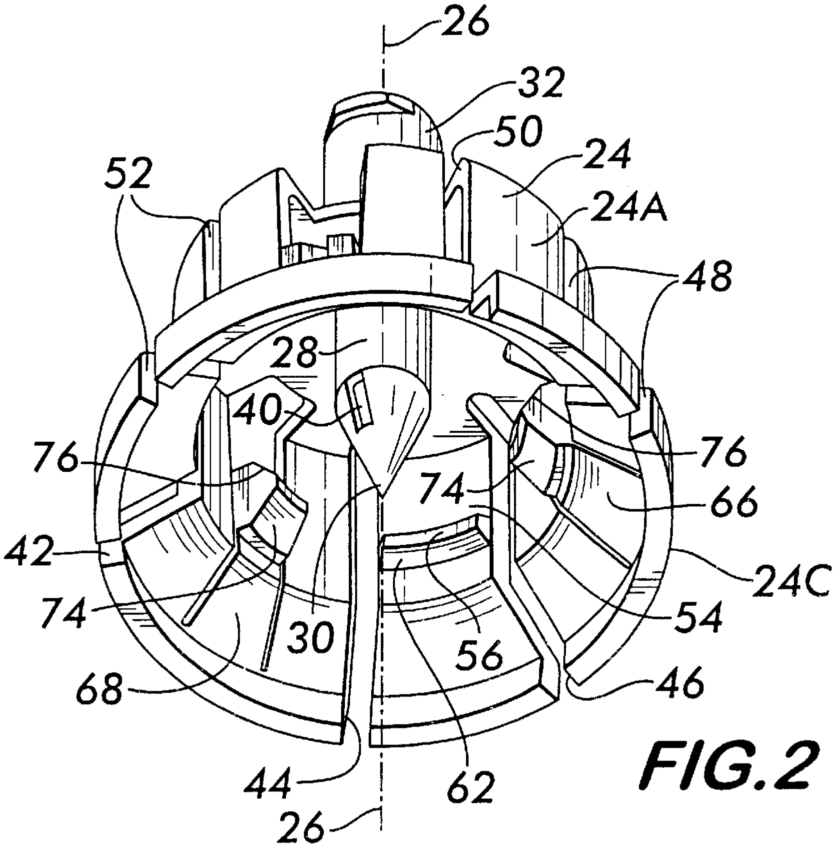
FIG. 2

FIG. 3
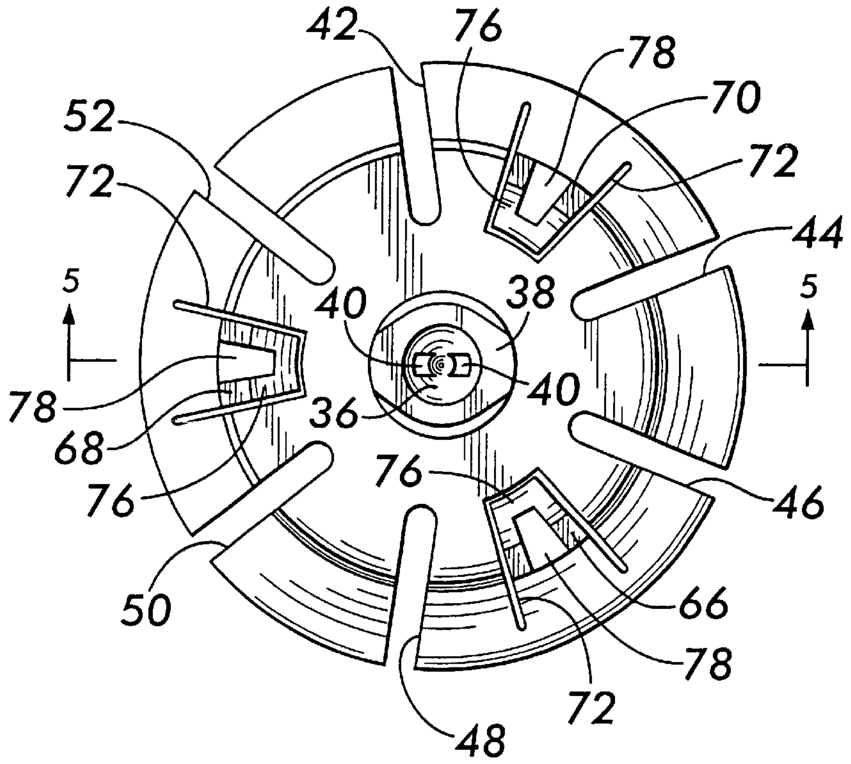
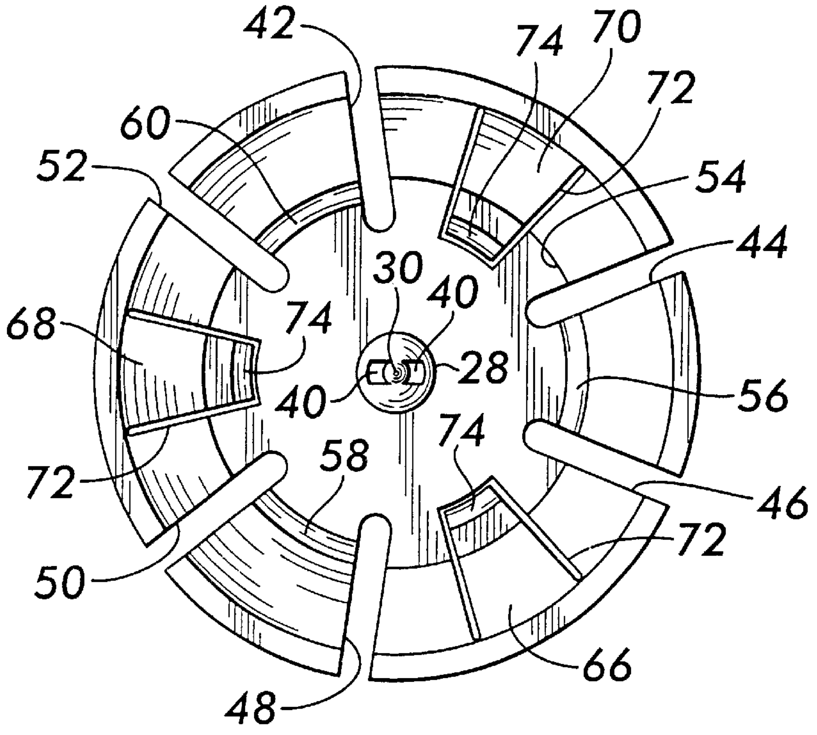
FIG. 4

FIG. 5
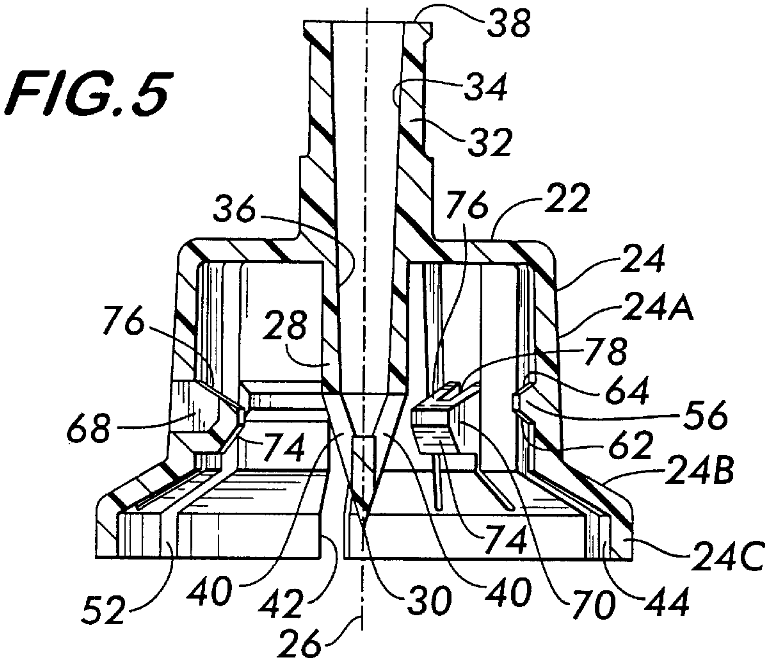
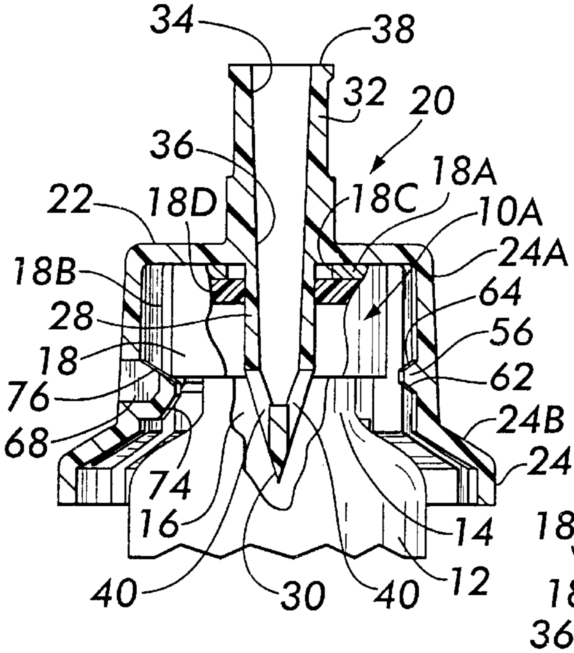
FIG. 6
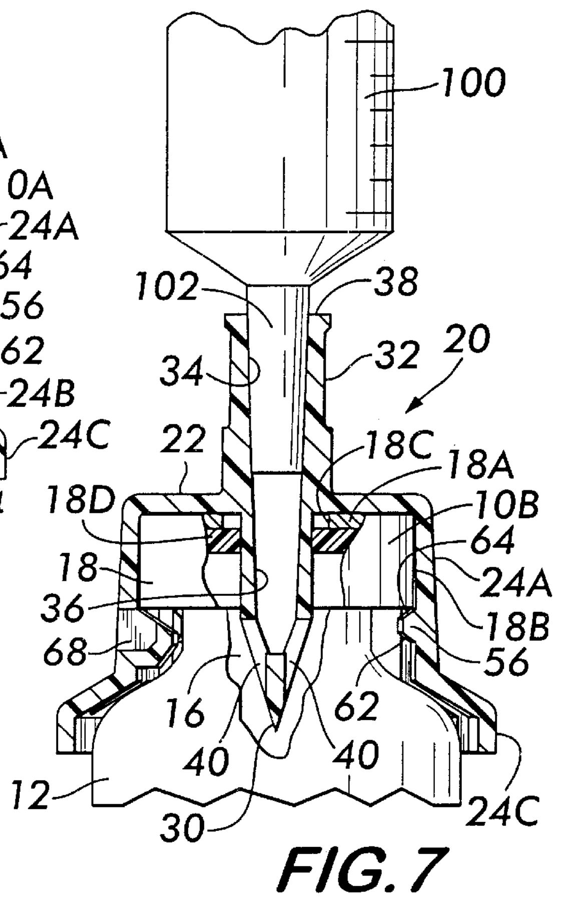
FIG. 7

VIAL ACCESS DEVICE FOR USE WITH VARIOUS SIZE DRUG VIALS

BACKGROUND OF THE INVENTION

This invention relates generally to vial access devices, and more particularly to an adaptor device for use with conventional pierceable-septa vials of different sizes to provide needle-less access to the interior thereof.

Conventional vials for containing drugs and the like typically comprise a cylindrical glass body closed at the bottom and terminating upwardly at a narrowed neck to an opening. The opening is closed or covered by a cap. The cap is usually formed of metal includes a pierceable septum formed of an elastomeric material, such as latex rubber or the like. The septum is arranged to be pierced by a sharp cannula or needle to either introduce or withdraw a fluid into/out of the vial. Upon withdrawal of the cannula/needle the septum reseals itself to maintain a sterile environment in the vial.

Various devices have been disclosed in the patent literature for penetrating the septum of a drug vial. For example, in U.S. Pat. Nos. 5,839,715 (Leinsing) and 6,142,446 (Leinsing) there is disclosed medical adaptors having both a needleless valve and a sharpened cannula for use with pierceable septa containers, e.g., drug vials, or other devices having different sizes. The adaptor includes a needle-less site at one end and a sharpened cannula at the other end protected by spring arms. The arms include claws at their distal ends to grasp the neck of the vial to which the sharpened cannula is to be inserted. The claws include sharpened points for gripping the device. The arms are located on either side of the adaptor body and are connected to the body through springs. Handles are also included on the arms for use by the operator to separate the arms against the spring forces during engagement of the adaptor with the septum. In one case, the handles include finger grips located above the springs for pressing the handles inward to open the arms and claws and in another case, the handles are located closer to the distal ends of the arms for pulling the arms outward. The adaptor in one case comprises only three parts for reduced materials and manufacturing expense.

Other adaptors for accessing the interior of a pierceable septum drug vial are found in U.S. Pat. No. 5,393,497 (Haber), U.S. Pat. No. 5,429,614 (Fowles et al.), and U.S. Pat. No. 6,113,583 (Fowles et al.).

While the foregoing devices may be suitable for their intended purposes they never the less leave something to be desired from one or more of the standpoints of simplicity of construction, easy of use, ability to be used with various size vials, and protection from accidental sticking of personnel.

SUMMARY OF THE INVENTION

An adaptor device for respective releasable mounting on first and second vials, e.g., drug vials, to provide needle-less access to the interior of each vial. Each vial is of conventional construction, e.g., a cylindrical glass body having a closed bottom and terminating upwardly at a narrowed neck to an opening that is closed by a cap that includes a pierceable septum formed of an elastomeric material. The cap includes a cylindrical rim of predetermined outside diameter that surrounds the septum. The predetermined outside diameter of the rim of the first vial is smaller than the predetermined outside diameter of the rim of the second vial.

The adaptor device comprises a longitudinal central axis along which a piercing member, e.g., sharpened cannula, extends and a peripheral sidewall surrounding the piercing member. The piercing member is hollow and terminates at a sharpened end arranged to pierce through the septum of the vial to which the device is releasably mounted. The peripheral sidewall includes an upper portion having a circular inner surface centered around the piercing member and a lower skirt flaring outward from the upper portion. The skirt terminates in a peripheral free edge extending beyond the sharpened end of the piercing member.

The peripheral sidewall of the adaptor includes a plurality, e.g., six, of slits extending upward from the peripheral edge of the skirt to enable portions of the sidewall between those slits to flex outward. The sidewall also includes plural equidistantly spaced projections, e.g., two groups of three projections each, extending radially inward adjacent the inner surface of the upper portion of the sidewall to form a ledge. These projection are resiliently mounted on the sidewall to enable the cap of the first vial to pass between the projections and then return to a position wherein the ledge has inside diameter just slightly less than the outside diameter of the rim of the first vial to form a seat on which the rim of the first vial may sit to releasably secure the adaptor to the cap of the first vial, and with the rim of the first vial being adjacent the inner surface of said sidewall and the sharpened end of the piercing member piercing through the septum of the first vial. The resilient mounting of the projections also enables the cap of the second vial to pass between the projections and then return to a position wherein the ledge has an inside diameter just slightly less than the outside diameter of the rim of the second vial to form a seat on which the rim of the second vial may sit to releasably secure the adaptor to cap of the second vial, with the rim of the second vial being adjacent the inner surface of the sidewall and with the sharpened end of the piercing member piercing through the septum of the second vial.

In accordance with one exemplary preferred embodiment of this invention the adaptor includes a top wall having a peripheral edge from which the sidewall projects and a tubular member secured to the top wall and extending along the longitudinal axis. The tubular member has a central passageway in fluid communication with the hollow piercing member to enable needle-less transfer of fluid therethrough.

DESCRIPTION OF THE DRAWING

FIG. 1 is an isometric view, looking downward from the top, of one exemplary embodiment of an adapter constructed in accordance with this invention;

FIG. 2 is an isometric view, looking upward from the bottom of the adaptor shown in FIG. 1;

FIG. 3 is a top plan view of the adaptor shown in FIG. 1;

FIG. 4 is a bottom plan view of the adaptor shown in FIG. 1;

FIG. 5 is a sectional view taken along line 5—5 of FIG. 3;

FIG. 6 is a side elevation view, partially in section, showing the adaptor of FIG. 1 mounted on a conventional small diameter pierceable capped vial; and FIG. 7 is a side elevation view, similar to FIG. 6, showing the adaptor of FIG. 1 mounted on a conventional large diameter pierceable capped vial and being used with an injector device to introduce a liquid into the vial or to extract a liquid from the vial.

DETAILED DESCRIPTION OF THE PREFERRED EMBODIMENT

Referring to FIG. 1, there is shown at 20 one exemplary embodiment of an adaptor device constructed in accordance with this invention for use with either small diameter pierceably capped vials 10A (FIG. 6) or large diameter pierceably capped vials 10B (FIG. 7). The adaptor 20 is arranged to be releasably mounted on either of those vials to pierce through the vial's cap (to be described hereinafter) to enable a liquid to be introduced through the adaptor into the vial and/or to be removed from the vial via the adaptor.

Before describing the adaptor, a brief description of the vials 10A and 10B is in order. To that end both vials are of identical construction except for their size. In particular vials 10A and 10B each include a glass bottle or vial 12 that closed at its bottom end (not shown) and terminates in an upwardly directed narrowed cylindrical neck 14 forming the opening or mouth 16 (FIGS. 6 and 7) to the interior of the vial. The mouth 16 is closed or covered by a cap 18. The cap includes a circular, generally planar top wall 18A and a cylindrical rim or circular sidewall 18B. As is conventional, the cap is typically formed of metal, e.g., stainless steel. The top wall of the cap includes a central circular opening 18C. The central opening 18C in each cap is closed by a thin, planar, pierceable disk-like septum 18D located centered under the top wall. The septum 18D is formed of an elastomeric material, such as latex rubber or the like. When the cap 18 is secured onto the neck 14 of the bottle 12, the septum 18D overlies the bottle's mouth as best seen in FIGS. 6 and 7.

As mentioned earlier the device 20 can be used with various conventional pharmaceutical vials. In the exemplary embodiments, the outside diameter of the cap 18 small vial 10A is approximately 1.75 cm, the outside diameter of the cap of the large vial 10B is approximately 2.06 cm, the diameter of the central opening 18C of the small vial 10A is approximately 0.95 cm, and the diameter of the central opening 18C of the large vial 10B is approximately 0.95 cm. All other features of the two vials 10A and 10B are the same.

The septum 18D is arranged to be pierced by a sharp cannula portion (to be described later) of the adaptor when the adaptor is mounted on the vial's cap to either introduce or withdraw a fluid into/out of the vial. The fluid can be introduced and/or withdrawn by any conventional device, such as a syringe or injector 100 shown in FIG. 7, coupled to the adaptor. Upon removal of the adaptor, the cannula is withdrawn back out through the septum, whereupon the septum reseals itself to maintain a sterile environment for anything remaining within the bottle 12.

The details of the adaptor device 20 will now be described. To that end, as best seen in FIGS. 1 and 2, the adaptor device 20 basically comprises a cup-shaped, hollow member formed of any suitable material, e.g., a tough, somewhat flexible plastic such as polycarbonate, having a generally planar, circular top wall 22 from which a peripheral sidewall 24 extends downward centered about a central longitudinal axis 26. The adaptor is preferably an integral or one-piece member molded of the heretofore identified plastic.

As best seen in FIG. 1, the sidewall 24 includes three portions, namely, an upper portion 24A which flares slightly outward and terminates at its lower end in an intermediate portion in the form of an angularly extending peripheral skirt 24B. The lower end of the skirt 24B terminates at the third portion of the sidewall, namely, an annular flange 24C. Thus, the sidewall 24 is made up of the three portions 24A, 24B and 24C.

As best seen in FIGS. 2 and 5–7, an elongated tubular cannula 28 projects downward from the inner surface of the top wall 22 along the central longitudinal axis 26 and terminates at a sharpened or pointed, e.g., conical, free end 30. The free end forms a piercing tip. The piercing tip 30 terminates slightly above the plane of the bottom of the annular flange 24C, as best seen in FIG. 5, so that the piercing tip is not exposed. This is of considerable importance to prevent persons using the device from being accidentally stuck by the tip 30.

A conventional tubular connector 32 extends upward from the outer surface of the top wall 22 centered about the central longitudinal axis 26. The connector 32 includes a central bore 34 extending through it in axial alignment with a central bore 36 extending through the cannula 28. The two bores 34 and 36 conjoin and taper slightly from the top or free end 38 of the connector 32 to the piercing tip 30 of the cannula 28 to form a central passageway through the adaptor 20. A pair of ports or outlets 40 are located in the conical tip 30 at diametrically opposed positions (see FIGS. 5–7) and are in fluid communication with the bore 36. The tubular connector is arranged to accommodate the tip 102 of a conventional syringe 100 or some other device therein, as shown in FIG. 7, whereupon fluid introduced by the syringe into the adaptor's connector 32 will pass through the bores 34 and 36 and out through the ports 40 in the piercing tip to flow into the vial 10A or 10B when the adaptor is connected thereto (as will be described later).

As best seen in FIGS. 3 and 4 the adaptor 20 includes a plurality of slits 42, 44, 46, 48, 50 and 52 about the periphery of the adaptor 20. Each of the slits extends upward the full height of the sidewall 24 and slightly radially into the top wall 22, i.e., from the bottom of the flange 24C to the top wall 22. The slits in the adaptor's sidewall enable portions of the sidewall between them to flex outward to enable the adaptor 20 to readily snap-fit on the cap of the vial 10A or the vial 10B, as will be described later. The slits 42, 46 and 50 are equidistantly spaced from one another about the periphery of the adaptor's sidewall. The slits 44, 48 and 52 are also equidistantly spaced from one another about the periphery of the adaptor's sidewall. The spacing between the immediately adjacent slits 44 and 46 is the same as the spacing between the immediately adjacent slits 48 and 50, and 52 and 42. In a similar manner, the spacing between the immediately adjacent slits 42 and 44 is the same as the spacing between the immediately adjacent slits 46 and 48, and 50 and 52. However, the spacing between the immediately adjacent slits 42 and 44, 46 and 48, and 50 and 52 is greater than that between the immediately adjacent slits 44 and 46, 48 and 50, and 52 and 42.

The sidewall 24 of the adaptor 20 includes plural projections which form expandable discontinuous ledges on which the caps of vials 10A and 10B rest when the adaptor is mounted on those vials. In particular, as can be seen in FIGS. 2 and 4 and as will be described hereinafter, the adaptor 20 includes two groups of three projections each, extending radially inward adjacent the inner surface 54 of the upper portion 24A of the sidewall 24 to form respective ledges. For example, the inner surface of the sidewall between slits 44 and 46 includes a projection extending inward radially to form a ledge 56, the inner surface of the sidewall between slits 48 and 50 includes a projection extending inward radially to form a ledge 58, and the inner surface of the sidewall between slits 52 and 42 includes a projection extending inward radially to form a ledge 60. The ledges 56, 58 and 60 form the first group of projections and are equidistantly spaced from one another about the central axis 26. Moreover, they are located at the same height on the inner surface of the adaptor's sidewall 24. Each of the individual ledges of the first group is in the form of an arcuate wall extending across the inner surface 54 of the adaptor's sidewall between contiguous slits. Together the individual ledges 56, 58 and 60 form a first discontinuous circular ledge on which the underside of the rim 18B of the cap of the large vial 10B rests when the adaptor is mounted on that vial. In particular, the inside diameter of the first discontinuous circular ledge is just slightly smaller than the outside diameter of the rim 18B of the large vial's cap 18.

Since the portions of the sidewall 24 from which the ledges 56, 58 and 60 project are separated from one another by the slits 44 and 46, 48 and 50, and 52 and 42, respectively, those portions of the sidewall 24 are arranged to flex or bend slightly outward when the adaptor is placed on the cap 18 of the large vial 10B. This action effectively temporarily enlarges or expands the inside diameter of the first discontinuous ledge to enable the cap 18 to pass thereby, whereupon the portions of the adaptor's sidewall holding the projections 56, 58 and 60 snap back into place. Once this has occurred the inside diameter of the first discontinuous ledge is again just slightly less than the outside diameter of the rim of the vial to form a seat on which the rim of the vial sits to releasably secure the adaptor that vial. When so mounted the rim 18B of the vial 10B is located adjacent the inner surface 54 of the sidewall 24, with the sharpened end 30 of the piercing member 28 piercing through the septum 18D of the vial as shown in FIG. 7. Thus, the ports 40 in the tip 30 are in fluid communication with the interior of the vial.

In order to facilitate the passage of the cap 18 through the first discontinuous circular ledge formed by projections 56, 58 and 60 to mount the adaptor on the vial 10B, the underside of each of those ledges is in the form of a cam surface 62 (FIGS. 2 and 5).

Mounting of the adaptor 20 on the cap of the vial 10B so that the cannula pierces the system 18D of the cap is as follows: The adaptor 20 is positioned over the cap 18 and pressed downward so that the cap enters the hollow interior of the adaptor. This causes the piercing tip to pierce through the cap's system. Continued downward pressure on the adaptor or upward pressure on the vial (or pressure from both directions) causes the top surface 18A of the cap 18 of the vial 10B contiguous with its rim to engage the undersurface 62 of the ledges 56, 58 and 60. Further pressure on the adaptor (or vial or both) causes the engaging portion of the cap to ride along the cam surfaces 62 of the ledges 56, 58 and 60 to cause the portions of the sidewall mounting those ledges to flex outward slightly until the rim of the cap clears the inner surface of the ledges, whereupon those portions of the sidewall will immediately snap-back into place to seat the adaptor on the cap of the vial.

The top surface of each of the ledges 56, 58 and 60 is also in the form of a cam surface 64. This surface facilitates the passage of the cap through the discontinuous circular ledge to remove the adaptor 20 from the vial 10B when it is desired to do so. In this regard when it is desired to remove the adaptor 20 from the vial 10B all that is required is to pull the two apart, whereupon the underside of the rim 18B of the cap will ride across the cam surface 64 of each of the ledges 56, 58 and 60. This action will cause the portions of the sidewall mounting those ledges to flex outward slightly until the rim of the cap clears the inner surface of the ledges, whereupon the cap is freed from the adaptor and those portions of the sidewall will immediately snap-back into place.

In order to mount the adaptor 20 onto the cap 18 of the smaller vial 10A, the adaptor 20 also includes a second group of projections. This second group is also made up of three resiliently mounted projections 66, 68 and 70. In particular, each of these projections is in the form of a cantilevered finger defined within the bounds of an inverted U-shaped slot 72 in the upper portion 24A and contiguous skirt portion 24B of the sidewall 24. For example, the inner surface of the sidewall between slits 46 and 48 includes an inverted U-shaped slot 72 bounding the projection 66. The projection 66 extends inward radially to form a ledge. In a similar manner the inner surface of the sidewall between slits 50 and 52 includes an inverted U-shaped slot 72 bounding the projection 68. The projection 68 extends inward radially to form a ledge. Lastly, the inner surface of the sidewall between slits 42 and 44 includes an inverted U-shaped slot 72 bounding the projection 70. The projection 70 extends inward radially to form a ledge. The ledges 66, 68 and 70 form the second group and are equidistantly spaced from one another about the central axis 26 and are located at the same height with respect to the adaptor's sidewall 24. Each of the individual ledges of the second group is in the form of an arcuate wall extending across the inner surface 54 of the adaptor's sidewall bounded by its associated U-shaped slot 72. Together the individual ledges 66, 68 and 70 form a second discontinuous circular ledge. It is on this second discontinuous ledge that the underside of the rim 18B of the cap 18 of the small vial 10A rests when the adaptor is mounted on that vial. In particular, the inside diameter of the second discontinuous circular ledge is just slightly smaller than the outside diameter of the rim 18B of the cap 18 of the small vial 10A.

Since the portions of the sidewall 24 from which the ledges 66, 68 and 70 project are separated from the contiguous portions of the sidewall 24 by the U-shaped slots 72, those portions of the sidewall are arranged to flex or bend slightly outward when the adaptor is placed on the cap 18 of the small vial 10A. This action effectively enlarges the inside diameter of the second discontinuous ledge to enable the cap 18 to pass thereby, whereupon the portions of the adaptor holding the projections 66, 68 and 70 snap back into place. Once this has occurred the inside diameter of the second discontinuous ledge is again just slightly less than the outside diameter of the rim of the vial to form a seat on which the rim of the vial may sit to releasably secure the adaptor that vial. When so mounted the rim 18B of the vial 10A is located adjacent but spaced from the inner surface 54 of the sidewall, with the sharpened end 30 of the piercing member 28 piercing through the septum 18D of the vial as shown in FIG. 6.

In order to facilitate the passage of the cap 18 of the small vial 10A through the second discontinuous circular ledge formed by the projections 66, 68 and 70 to mount the adaptor on the vial 10A, the underside of each of those ledges is in the form of a cam surface 74 (FIGS. 5–7) to facilitate the mounting of the adaptor 20 onto that vial. The top surface of each of the projections or ledges 66, 68 and 70 is also in the form of a cam surface 76 (for reasons that will be appreciated from the discussion to follow). A radially directed slot 78 is located in the top surface 76 of each of the ledges 66, 68 and 70.

When the adaptor 20 is to be mounted on the small vial 10A, it is disposed over the cap of the vial so that the cap is within the hollow interior of the adaptor. The adaptor is then pressed downward or the vial pressed upward (or both are pressed together). This action causes the top surface 18A of the cap 18 of the vial 10A contiguous with its rim to engage the undersurface 74 of the fingers or ledges 66, 68 and 70. Further pressure on the adaptor (or vial or both) will cause the engaging portion of the cap to ride along the cam surfaces 74 of the underside of the ledges 66, 68 and 70 to cause the portions of the sidewall bounded by the associated U-shaped slots 72 and which mount those projections to flex outward slightly until the rim of the cap clears the inner surface of the ledges. Once this has occurred the portions of the sidewall mounting the projections 66, 68 and 70 will immediately snap-back into place to seat the adaptor on the cap of the vial. In particular, the underside of the rim 18B of the cap 18 will rest on the cam top surface 76 of each of the projections 66, 68 and 70. As will be appreciated by those skilled in the art, since the top surface 76 is in the form of a cam or slope the adaptor 20 can accommodate other sized vials whose caps are smaller than the cap of vial 10B but larger than the cap of vial 10A. Moreover, since the top surface of each of the ledges 66, 68 and 70 is in the form of a cam surface 64, these surfaces facilitate the passage of the cap through the second discontinuous circular ledge formed by those projections to remove the adaptor 20 from the vial 10A when it is desired to do so. In this regard when it is desired to remove the adaptor 20 from the vial 10A all that is required is to pull the two apart, whereupon the underside of the rim 18B of the cap will ride across the cam surface 76 of each of the fingers or ledges 66, 68 and 70. This action will cause the portions of the sidewall mounting those ledges to flex outward slightly until the rim of the cap clears the inner surface of the ledges, whereupon the cap is freed from the adaptor and those portions of the sidewall will immediately snap-back into place.

It should be appreciated by those skilled in the art that when the adaptor 20 is mounted to the large cap vial 10B, the cap of that vial must also pass by the projections or fingers 66, 68 and 70 in order to be seated on the first discontinuous ledge (i.e., the ledge formed by the projections 56, 58 and 60 as described earlier). Thus, when the adaptor 20 is to be mounted on the large cap vial 10B by placing the cap of the vial in the interior of the adaptor and pressing downward onto the adaptor or upward on the vial (or in both directions) the cannula will pierce the system and the top surface 18A of the cap contiguous with the rim 18B will engage the cam surface 74 on the underside of each of the projections 66, 68 and 70. Further pressure on the adaptor (or vial or both) will cause the engaging portion of the cap to ride along those cam surfaces to cause the portions of the sidewall mounting the ledges to flex outward slightly until the rim of the cap clears the inner surface of the ledges. Continued pressure on the vial, adaptor or both brings the top surface 18A of the cap contiguous with the rim into engagement with the undersurface 62 of the ledges 56, 58 and 60 to cause them to begin to flex outward as described above. Continued pressure will also cause those portions of the sidewall mounting the ledges 56, 58 and 60 to flex outwardly by a sufficient distance so that the cap clears them, whereupon those portions of the sidewall will immediately snap-back into place to seat the adaptor on the cap of the vial as described above.

As will be appreciated by those skilled in the art during the removal of the adaptor 20 from the vial 10B, the underside of the cap's rim 18B will also ride across and down the cam top surface of each of the ledges 66, 68 and 70 in addition to riding down the cam top surface 64 of the ledges 56, 58 and 60. This latter action causes the portions of the sidewall mounting the 66, 68 and 70 ledges to flex slightly outward until the cap clears those ledges, whereupon the cap will be freed from the adaptor.

Without further elaboration the foregoing will so fully illustrate my invention that others may, by applying current or future knowledge, adopt the same for use under various conditions of service.

I claim:

1. An adaptor device for releasable mounting on respective first and second fluid vials to provide needle-less access to the fluid within each vial, each vial having a cap including a cylindrical rim of predetermined outside diameter and a pierceable septum bounded by the rim, the predetermined outside diameter of the rim of the first vial being smaller than the predetermined outside diameter of the rim of a second vial, said adaptor device comprising a longitudinal central axis along which a piercing member extends and a peripheral sidewall surrounding said piercing member, said piercing member being hollow and terminating at a sharpened end arranged to pierce through the septum of the vial to which said device is releasably mounted, said peripheral sidewall including an upper portion having a circular inner surface centered around said piercing member and a lower skirt flaring outward from said upper portion, said skirt terminating in a peripheral free edge extending beyond said sharpened end of said piercing member, said peripheral sidewall having a plurality of slits extending upward from said peripheral edge to enable portions of said sidewall between said slits to flex outward, said sidewall including plural equidistantly spaced projections extending radially inward adjacent the inner surface of said upper portion of said sidewall to form a ledge, said equidistantly spaced projections being resiliently mounted on said sidewall to enable the cap of the first vial to pass between said projections and then return to a position wherein said ledge has an inside diameter just slightly less than the outside diameter of the rim of the first vial to form a seat on which the rim of the first vial may sit to releasably secure said adaptor to the cap of the first vial, with the rim of the first vial being adjacent said inner surface of said sidewall and said sharpened end of said piercing member piercing through the septum of the first vial, said resilient mounting of said equidistantly spaced projections also enabling the cap of the second vial to pass between said projections and then return to a position wherein said ledge has an inside diameter just slightly less than the outside diameter of the rim of the second vial to form a seat on which the rim of the second vial may sit to releasably secure said adaptor to the cap of the second vial, with the rim of the second vial being adjacent said inner surface of said sidewall and with said sharpened end of said piercing member piercing through the septum of the second vial.

2. The adaptor of claim 1 additionally comprising a top wall having a peripheral edge from which said sidewall projects, a tubular member secured to said top wall and extending along said longitudinal axis, said tubular member having a central passageway in fluid communication with said hollow piercing member.

3. The adaptor of claim 1 wherein said projections comprise a first set that are mounted on respective fingers, and wherein each of said fingers comprises a portion of said skirt.

4. The adaptor of claim 3 wherein said projections also comprise a second set that project inward from the inner surface of said sidewall at said upper portion, said projections of said first set and said projections of second set alternating with one another about the inner surface of said sidewall.

5. The adaptor of claim 4 wherein said adaptor includes three fingers, each of which mounts a respective one of said first set of projections.

6. The adaptor of claim 5 wherein portions of said sidewall between selected ones of said slits include respective openings therein, each of said fingers extending into a respective one of said openings.

7. The adaptor of claim 1 wherein said adaptor is an integral unit of a resilient material.

8. The adaptor of claim 2 wherein said tubular member includes an open proximal end.

9. The adaptor of claim 8 wherein said tubular member includes a releasably securable connector located at said open proximal end for releasably coupling to a syringe.

10. The adaptor of claim 1 wherein said piercing member comprises a cannula having a tapered distal end and a port located in said tapered distal end communicating with the interior of said cannula.

11. In combination first and second fluid vials and an adaptor device for releasable mounting on respective ones of said first and second fluid vials to provide needle-less access to the fluid within each vial, each of said first and second vials having a cap including a cylindrical rim of predetermined outside diameter and a pierceable septum bounded by said rim, the predetermined outside diameter of said rim of said first vial being smaller than the predetermined outside diameter of said rim of said second vial, said adaptor device comprising a longitudinal central axis along which a piercing member extends and a peripheral sidewall surrounding said piercing member, said piercing member being hollow and terminating at a sharpened end arranged to pierce through said septum of said first or second vial to which said device is releasably mounted, said peripheral sidewall including an upper portion having a circular inner surface centered around said piercing member and a lower skirt flaring outward from said upper portion, said skirt terminating in a peripheral free edge extending beyond said sharpened end of said piercing member, said peripheral sidewall having a plurality of slits extending upward from said peripheral edge to enable portions of said sidewall between said slits to flex outward, said sidewall including plural equidistantly spaced projections extending radially inward adjacent the inner surface of said upper portion of said sidewall to form a ledge, said equidistantly spaced projections being resiliently mounted on said sidewall to enable said cap of said first vial to pass between said projections and then return to a position wherein said ledge has an inside diameter just slightly less than the outside diameter of the rim of said first vial to form a seat on which said rim of said first vial may sit to releasably secure said adaptor to said cap of said first vial, with said rim of said first vial being adjacent said inner surface of said sidewall and said sharpened end of said piercing member piercing through said septum of said first vial, said resilient mounting of said equidistantly spaced projections also enabling said cap of said second vial to pass between said projections and then return to a position wherein said ledge has an inside diameter just slightly less than the outside diameter of said rim of said second vial to form a seat on which said rim of said second vial may sit to releasably secure said adaptor to said cap of said second vial, with the rim of said second vial being adjacent said inner surface of said sidewall and with said sharpened end of said piercing member piercing through said septum of said second vial.

12. The combination of claim 11 additionally comprising a top wall having a peripheral edge from which said sidewall projects, a tubular member secured to said top wall and extending along said longitudinal axis, said tubular member having a central passageway in fluid communication with said hollow piercing member.

13. The combination of claim 11 wherein said projections comprise a first set that are mounted on respective fingers, and wherein each of said fingers comprises a portion of said skirt.

14. The combination of claim 13 wherein said projections also comprise a second set that project inward from the inner surface of said sidewall at said upper portion, said projections of said first set and said projections of second set alternating with one another about the inner surface of said sidewall.

15. The combination of claim 14 wherein said adaptor includes three fingers, each of which mounts a respective one of said first set of projections.

16. The combination of claim 15 wherein portions of said sidewall between selected ones of said slits include respective openings therein, each of said fingers extending into a respective one of said openings.

17. The combination of claim 11 wherein said adaptor is an integral unit of a resilient material.

18. The combination of claim 12 wherein said tubular member includes an open proximal end.

19. The combination of claim 18 wherein said tubular member includes a releasably securable connector located at said open proximal end for releasably coupling to a syringe.

20. The combination of claim 11 wherein said piercing member comprises a cannula having a tapered distal end and a port located in said tapered distal end communicating with the interior of said cannula.

* * * * *